Aug. 17, 1965    J. MORRIS    3,201,559
APPARATUS AND METHOD FOR FORMING HELICALLY WELDED TUBING
Filed Feb. 1, 1963    3 Sheets-Sheet 1
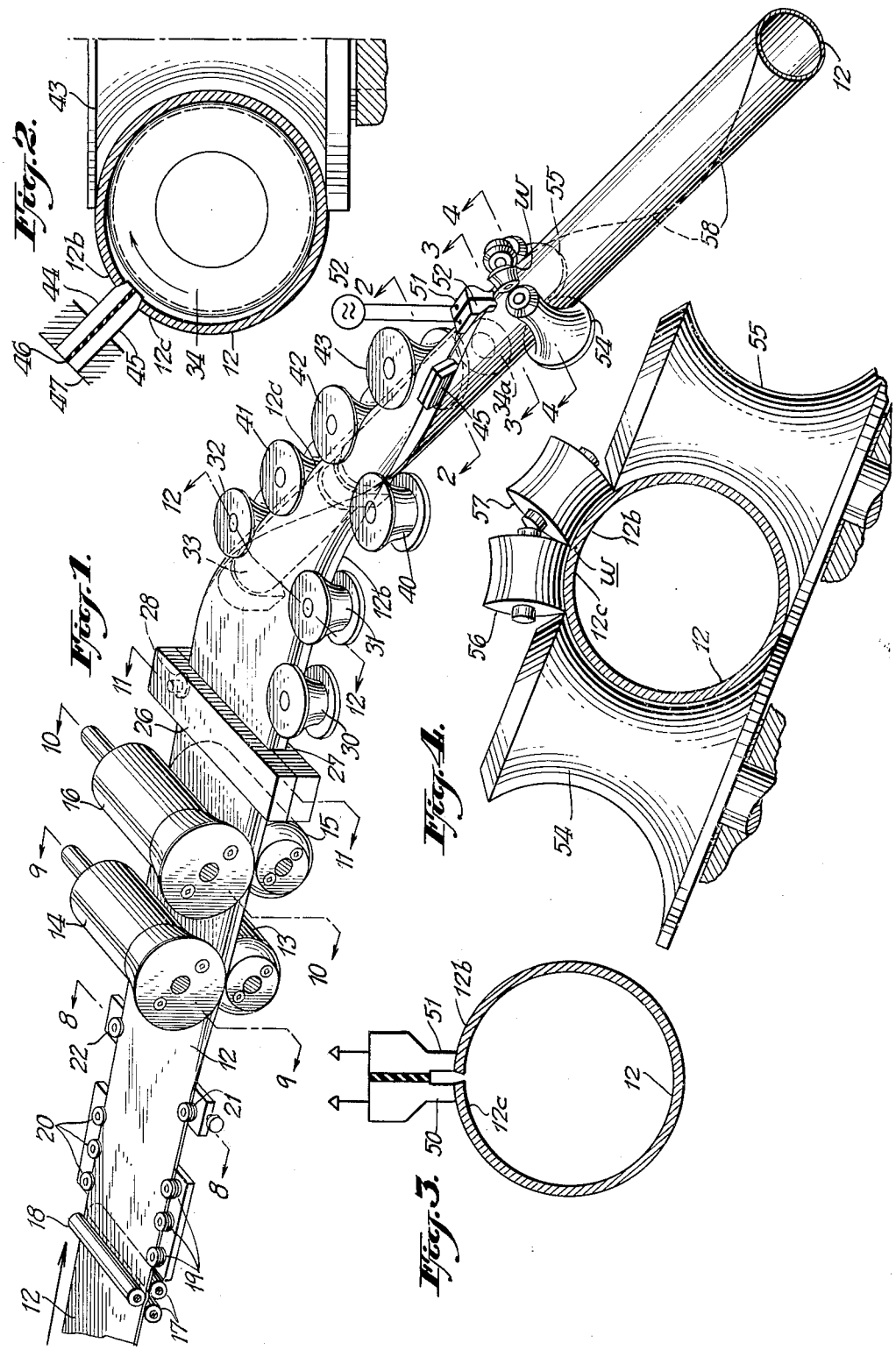

Aug. 17, 1965  J. MORRIS  3,201,559
APPARATUS AND METHOD FOR FORMING HELICALLY WELDED TUBING
Filed Feb. 1, 1963  3 Sheets-Sheet 2
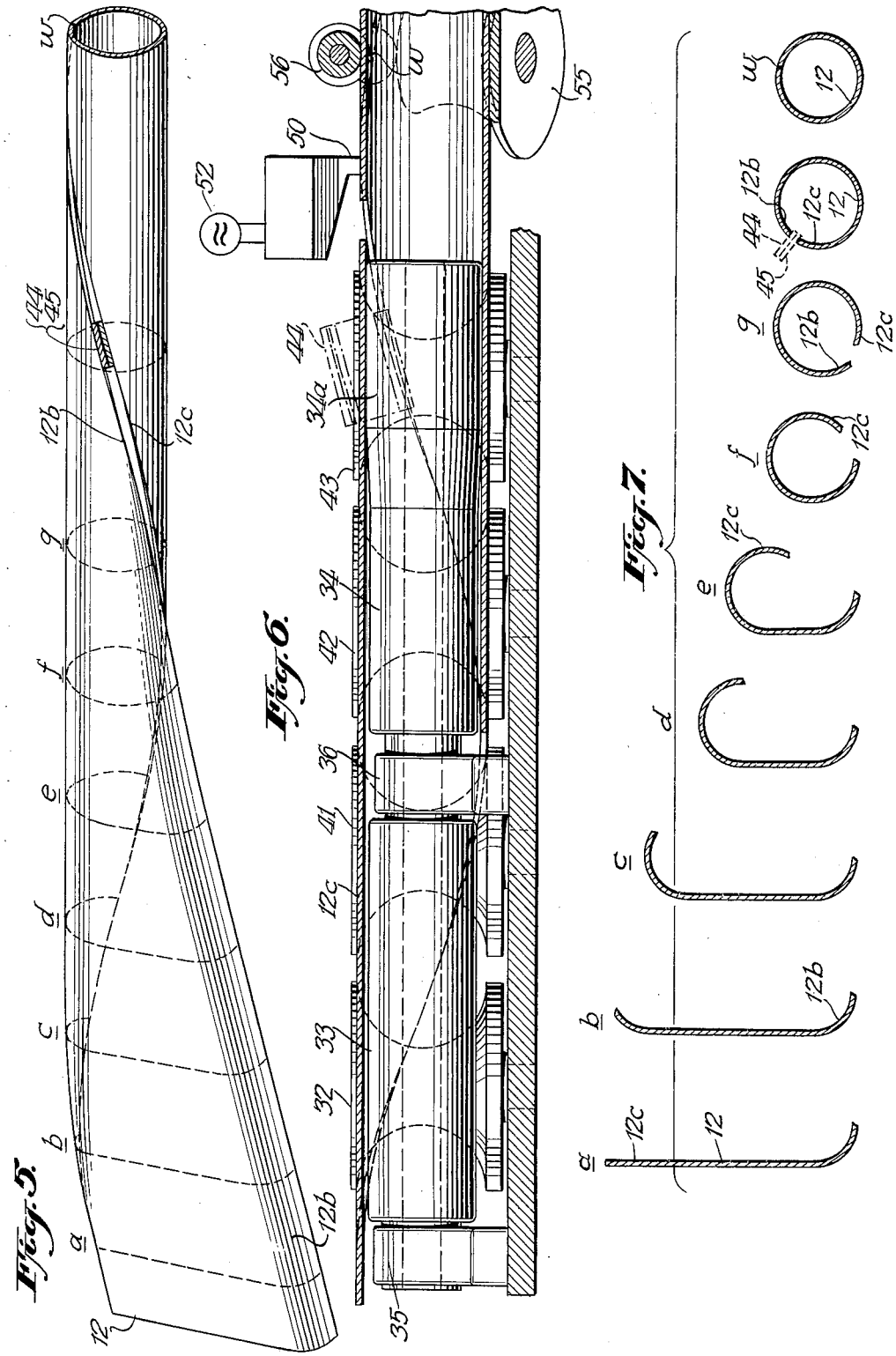

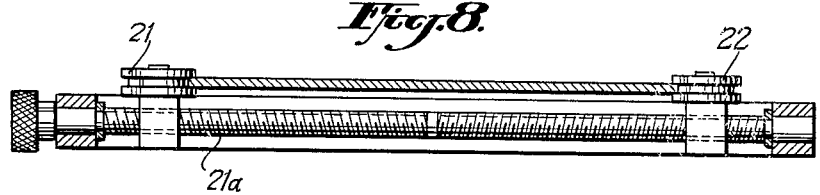
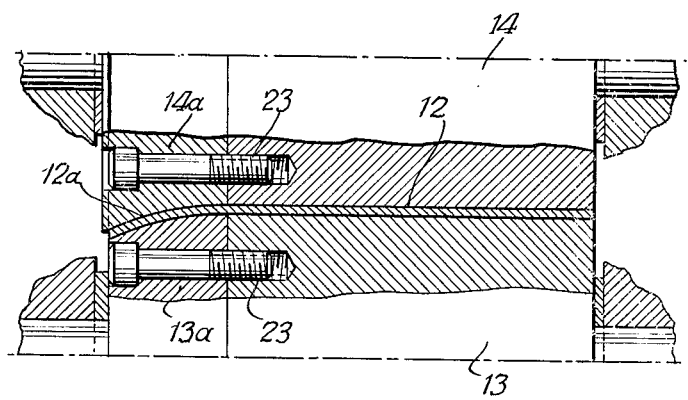
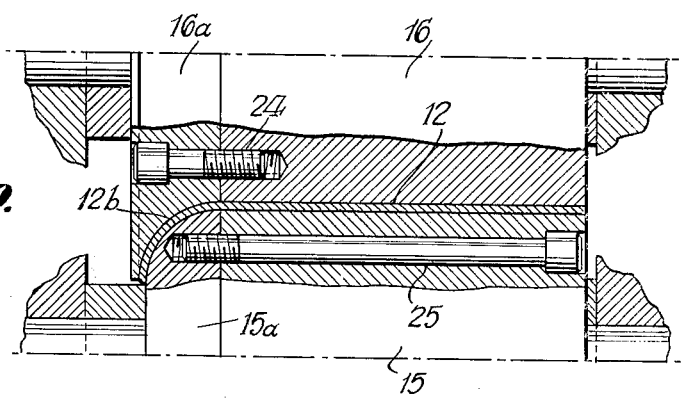
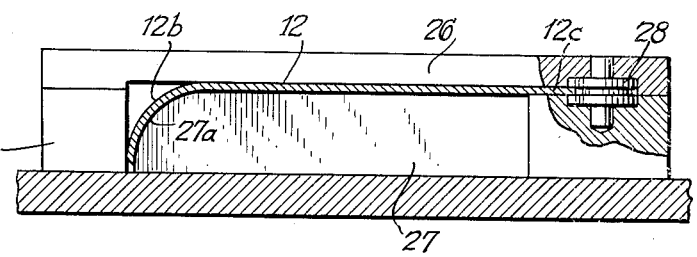
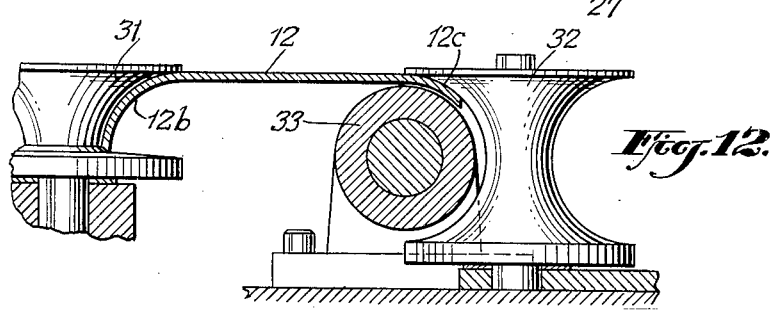

United States Patent Office 3,201,559
Patented Aug. 17, 1965

3,201,559
APPARATUS AND METHOD FOR FORMING
HELICALLY WELDED TUBING
Jack Morris, Monsey, N.Y., assignor to American
Machine & Foundry Company, New York, N.Y.,
a corporation of New Jersey
Filed Feb. 1, 1963, Ser. No. 255,563
8 Claims. (Cl. 219—62)

This invention relates to a method and apparatus for forming helically welded metal tubing, the welding being accomplished by utilizing high frequency electrical current.

Metal tubing has heretofore been manufactured with a high degree of success by welding the same through the use of high frequency electrical heating currents, so applied as to heat to welding temperature the edges of a strip being formed into the tubing, the heat being so applied as to flow along the approaching edges to be welded and across the weld point. There are two general methods for accomplishing this: first by forming an advancing strip into tubing of C-shaped cross-section and then pressing together and welding the opposed edges thereof to form a straight, longitudinal weld; and secondly, by helically wrapping the strip to form the tubing with a helically extending weld.

For the latter method, it has heretofore been proposed in the U.S. patent to Rudd, No. 2,873,353, for example, to form helically welded tubing by advancing a metal ribbon generally flatwise and tangentially of a convolution of the desired tubing, with the edges of the ribbon positioned at a sharp angle to the axis of the tubing being formed, thereby forming a succession of convolutions which are advanced longitudinally of said axis and while the trailing edge of each of the completely formed convolutions is welded to the forward edge of the tangentially advanced ribbon by applying high frequency current to such edges shortly in advance of the weld point where same come together. That is, a narrow V-shaped gap occurs between the trailing edge of one of the completed convolutions and the edge of the ribbon which is advancing to the weld point and the opposed edges of this V-shaped gap are heated by the high frequency current applied by contacts engaging opposite sides of the gap respectively, the current flowing from the contacts to and from the weld point.

While this method has proven to be highly successful under various conditions and circumstances, yet in some cases as where the tubing is to be of large diameters, the conditions are such that the V gap may be so narrow as to sometimes cause "pre-arcing" just in advance of the weld point, thereby in effect short-circuiting the current from properly bringing the weld point to welding temperature. Also, the desirable close control of the temperature range may become difficult for cases such as the welding of nonferrous metal such as aluminum for example. Difficulties may also be encountered in forming a butt-welded seam by this method because of the necessity of applying sufficient pressure edgewise of the metal ribbon as it tangentially comes into place and which, for a so-called "forged" type of butt weld, requires that the heated edges be forcefully pressed together at the moment of welding. Also, for butt welding, the heating pattern on the approaching edges may not be ideal for thick metal since on the approaching edge surfaces, the upper corner of the trailing edge initially comes closest to the lower corner on the forward edge of the tangentially-advancing ribbon, so that, by reason of mutual inductance between the currents on said edges, said corners may tend to receive more heating than other portions of the approaching edges. Nevertheless, this method of producing tubing by helical welding has proven highly desirable in that the resulting tubing as formed is ordinarily quite straight, and due to the helical form of the weld, the walls of the tubing symmetrically are of uniform strength. Also it is noteworthy that equipment of this type requires only a relatively short space, as compared with tube mills required for longitudinal welding.

On the other hand, while the method of forming tubing by straight, longitudinal welding with high frequency current, may be carried out at great speed and with a highly satisfactory butt weld being formed, yet tube mills for this purpose are generally necessarily quite long, for example 150 to 175 feet, or more than ten times as long as necessary for forming helically-welded tubing, although the above-noted shortcomings of the helical welding method may be avoided.

The present invention provides a method and apparatus uniquely adapted for overcoming the disadvantages of both of the prior types of methods above referred to, while at the same time having in large measure the advantages of both. In accordance with the present invention, while the tubing is helically welded and the resulting tubing has the general advantages of helically-welded tubing as above noted, yet the metal strip as advanced in forming of tubing and welding the same, is fed in the direction at a compartively small angle with respect to the axis of the finished tubing so that the pitch angle of the helical weld is quite small. Also the strip is so advanced and while being so transversely curled, that it becomes tubular with a C-shaped cross-section well in advance of the weld point and in such manner that the approaching edges of the strip form a somewhat helically-extending V-shaped gap and the edges come together with the surface of one edge directly facing and coextensive with the surface of the opposed edge, rather than having such edges relatively offset as they approach the weld point as in former methods, hereinabove described, of helically welding tubing. Consequently at the weld point, the tubing may be passed between opposed rollers for forcefully bringing the edges into their final welded engagement so as to produce a good forged weld, as is possible with the longitudinal welding by high frequency as heretofore practiced.

Preferably, in accordance with the method and apparatus of this invention, the initially flat strip used for forming the tubing is first shaped so that one of its edges will have a pronounced arcuate curvature. This lends rigidity to the strip, so that thereafter it may be advanced through the welding equipment by rollers which push the strip forward as a rigid bar. Also this initial curvature of one edge of the strip serves to prepare that edge with a curvature close to that which it will have in the finished tubing and then as the opposite edge portions come substantially into positions for forming elements of the desired tubing surface, such opposite edge portions are also transversely curved, and finally the whole strip is gradually more and more curved around, so that the edges come into the preferred opposed, squarelyaligned relation, ready for good high-pressure welding engagement therewith, as above indicated. In short, and expressing the conditions in another way, although the weld is of helical form, the tube metal is gradually brought into a C-shaped cross-section and with a helically-extending, V-shaped gap considerably in advance of the weld point, whereas with helically welded tubing utilizing high frequency current heating, heretofore the metal strip remained flat as it tangentially approached the formed tubing and became wrapped around to form such tubing.

While the high frequency current for heating the gap edges in advance of the weld point is preferably applied by contacts engaging the opposed edges respectively, from which the current flows along the gap edges to and from the weld point, such edges, if preferred, may be heated by use of high frequency induction coils having one or more turns located either externally or internally of the tubing at a region shortly in advance of the weld point. Also, while the invention is particularly well adapted for forming a helical butt weld, according to certain aspects of the invention, by suitably shaping the so-called "squeeze rollers" at the vicinity of the weld point, externally as well as internally, one may alternatively form a helical weld of the lapped type, flattened to the extent desired.

Various further and more specific objects, features and advantages of the invention will appear from the description given below, taken in connection with the accompanying drawings, illustrating by way of example a preferred form of the invention.

In the drawings:

FIG. 1 is a perspective view showing the essential features of the apparatus in accordance with the invention in a preferred form;

FIGS. 2, 3 and 4, respectively, are transverse sectional views taken substantially along the lines 2—2, 3—3 and 4—4 of FIG. 1;

FIG. 5 is a perspective view illustrating certain aspects of the method of the invention and particularly the manner in which the sheet metal strip is advanced as same is shaped into tubular form and passing through the apparatus;

FIG. 6 is a longitudinal sectional view of the portions of the apparatus for shaping the metal in the manner illustrated in FIG. 5;

FIG. 7 shows a series of cross-sectional views of tube metal as same is being shaped, the sections as indicated at *a* to *g* inclusive, being taken at locations identified by the same letters in FIG. 5;

FIG. 8, 9, 10 and 11, respectively, are sectional views taken substantially along section lines of corresponding numbers as indicated in FIG. 1; and FIG. 12 is another sectional view, taken substantially along the line 12—12 of FIG. 1.

Referring now to the drawings in further detail, as shown in FIG. 1, a strip 12 of sheet metal which is to be formed into tubing, is pulled from a suitable reel thereof by frictional engagement between a pair of driven rollers 13 or 14, and if desired by a supplemental similar pair of rollers 15, 16, which may also be suitably driven. The strip first passes in engagement with small rollers as at 17, 18, for holding the sheet metal in proper flatwise condition, thence past edge guide rollers as at 19, 20 and 21, 22, all of these rollers being suitably adjustable in position as desired, and to accommodate a metal strip of the desired width. Such adjustment may be accomplished by screw means supporting the bearings therefor, as shown at 21a in FIG. 8, for example.

In FIG. 9, that part of roller 13 and its bearings is shown which is above the center line thereof; and similarly, that portion of roller 14 and its bearings is shown which is below its center line. FIG. 9 also illustrates the manner in which the edge portions 12a of the strip 12 are here caused to be curved downwardly upon passing between the nip of correspondingly curved roller portions 13a and 14a, these portions being removably secured as by bolts 23 to the main body portions of rollers 13, 14, these roller portions being thus made readily removable so that they may be replaced by others with different curvatures, if desired, depending upon the extent and degree of the curvature desired to be imparted to the strip at this location, and this in turn may be varied depending upon the width of the strip and consequent diameter of the tubing being formed.

FIG. 10 is a similar view of those portions of rollers 15 and 16 and the bearings therefor which are located between their respective axes. As here shown, the rollers 15 and 16 are provided with end portions 15a and 16a, suitably shaped to impart a further curvature as at 12b to the edge portions of the strip 12. The roller portions 15a and 16a as in the case of roller portion 13a and 14a, are removable and replaceable, same being retained as by bolts 24, 25 and whereby the portions 15a and 16a may be replaced by others to accommodate strip curvatures of different degrees and extent, as desired.

After leaving rollers 15 and 16, the strip 12 with the curved edge portion 12b will now be in condition to be relatively rigid against vertical deflection, such rigidity being imparted thereto by reason of the extensive curved edge portion 12b. Thus the strip is in good condition to be firmly and uniformly advanced by being pushed forwardly by the rollers 13, 14 and 15, 16, to slide between a pair of upper and lower guide plates as at 26, 27, as best shown in FIG. 11. The edge 12c of the strip 12 which is still in flat condition, may be guided by an idler roller as at 28, whereas the edge 12b will be guided by the support portion 29 for the plate 26, and by the curved edge portion 27a of the plate 27.

Next the strip 12 advances with its curved edge portion engaging correspondingly-shaped guide rollers at 30, 31. Meanwhile, the edge 12c of the strip at a region shortly in advance of a suitably-shaped guide roller 32, starts to become curled or curved downwardly, as best shown in FIG. 12, and the extent of such curvature will be limited by a rotatable mandrel portion 33. Such mandrel may be formed with two rotatable portions 33 and 34 (see FIG. 6) mounted to be freely rotatable on bearings such as indicated at 35 and 36. As is further indicated in FIG. 6, the mandrel portion 33 may be of a size to have free clearance with respect to the strip edge 12c which is being curled partially thereabout. Also the left hand end of the mandrel portion 34, as viewed in FIG. 6, may have similar clearance with respect to the strip as being formed into tubing, but preferably the right hand portion 34a is made relatively larger so as closely to fit within the strip portions, which, at this region, will largely surround the same in contact therewith.

Next the strip edge 12b, while retaining approximately the same degree and extent of curvature, passes a suitably-shaped guide roller 40, and meanwhile the other strip edge 12c passes additional suitably-shaped guide rollers 41, 42, which cause the edge 12c to become more and more curved around and in under the edge 12b.

Then, as shown in FIG. 2, while the strip at 12b will be raised somewhat, the strip edge 12c will have become curved around by reason of engagement with the rollers 41, 42, and then with an additional roller 43, so that the strip edges will now be in opposed positions, and here, as shown in FIG. 2, same may be engaged slidably by seam-guide means comprising a pair of suitable wear-resistant elements as at 44, 45, separated by suitable insulation means 46, the seam-guide structure being suitably supported by firm stationary means, partially indicated at 47 in FIG. 2. It will be noted in FIG. 2 that the strip 12 will be in the form of a tube having a C-shaped cross-section, and in FIG. 5 it will be noted that there is a somewhat helical V-shaped gap in advance of the weld point *w*.

And thus-formed tubing next passes beneath a pair of contacts as at 50, 51, suitably mounted to engage respectively at opposite sides of the gap, these contacts being connected to a suitable source of high frequency current as indicated at 52, for supplying heating current which flows on the opposed gap edges from the contacts to and from the weld point w, the current being sufficient to heat such edges in advance of that point and up to welding temperature by the time the edges come into engagement with each other at the weld point. The frequency of such current should preferably be in the neighborhood of three or four hundred thousand cycles per second or higher, although lower frequencies down to the range of fifty to one hundred thousand cycles may under some circumstances be used. Also, as hereinabove mentioned, if preferred the high frequency current may be inductively applied by known methods to the gap edges at this region.

At opposite sides of the region of the weld point, the tubing is engaged by so-called "squeeze rollers" as at 54, 55, the surfaces of which are so shaped as to impart to the tubing a circular cross-section, as shown in FIG. 4, and preferably these rollers are so spaced that the gap edges in the tube are forcefully brought into engagement under sufficiently heavy pressure so that a good forged type of weld is formed. At the region of or closely adjacent to the weld point w, a pair of supplemental, slightly spaced-apart smaller rollers as at 56, 57 are preferably provided, these being mounted on axes at suitable angles so that the surfaces thereof firmly engage, along circumferentially-extending arcs, the upper portions of the tube metal at opposite sides of the weld line, which is indicated at 58 in FIG. 1.

The manner in which the various portions of the advancing strip 12 become curved into tubular form, is more clearly shown in FIGS. 5 and 7, from which it will be noted that the edge portion 12a, after once being curved downwardly, as by the rollers 15, 16, continues to maintain substantially such curvature as shown by the successive sectional views $a$ to $f$ in FIG. 7. This curved edge 12a not only lends rigidity to the metal strip permitting it to be pushed forward through the machine, but does so in such manner that the other portions of the strip may be readily "spiralled" or twisted without stretching the two edges differently, and enabling the edges to be brought substantially squarely together ultimately at the weld point. As shown at section $g$, the edge portions 12a will have become raised somewhat and the formed tube here will be somewhat elliptical. Meanwhile, as shown by the sections $a$ to $g$ in FIG. 7, the opposite edge portions 12c will have become curved down and around finally to a position so as to form a gap in the then C-shaped tubing and with the edge portions 12a and 12c then opposing each other in non-offset relation. In other words, the edge portions 12a as advanced over the greater part of their travel through the apparatus, retain their angular positions with respect to the axis of the tubing being formed, whereas the edge portions 12c become bent over, down and around, and finally upwardly, to oppose the edge 12a, and spaced therefrom to the degree permitted by the seam guide 44, 45. And by the time that the tubing advances to the weld point, its wall surfaces will be circular in cross-section, and accordingly well adapted to be forcefully engaged by the squeeze rollers 54, 55 and the rollers 56 and 57, to force the heated edges at the weld point into a forge-welded relationship without collapsing or distortion. Since the opposed edges at the V-shaped gap just in advance of the weld point, will be in positions to come together in substantially non-offset relation and with each edge surface coextensive with the opposed edge surface, the high frequency current, by reason of mutual inductance, will tend to be quite uniformly distributed over both edge surfaces, and thus provide uniform heating thereof throughout their depths.

Thus the invention provides for the formation of tubing or pipes having the advantages of helical welding in that the walls thereof will be circumferentially of symmetrical strength and form, and the tubing quite straight, with a welded seam of a strength comparable to that of the metal at other points, and of a quality comparable to that obtainable by straight longitudinal welding methods. To the extent necessary, the weld line may be scarfed internally and externally by known forms of scarfing devices.

As above stated, the pitch angle of the helical weld with respect to the axis of the tubing, should be quite small, at least as compared with helically welded tubing heretofore generally available. In a typical case, this angle may preferably be about 20°, although it may be varied by some ten degrees or thereabouts, either way. With smaller angles the equipment rapidly becomes necessarily much longer, thus offsetting the advantages of providing a machine which, with the preferred angle of about 20° and for making pipe about twelve inches in diameter, for example, need not have a base longer than about ten feet. On the other hand, if the angle is made larger, then the problems of bringing the opposed edges directly into accurate alignment and under heavy pressure for a good forged weld, become more difficult.

It should be noted that the width of the strip used for forming the tubing preferably has approximately the following relationship to other factors, if the pitch angle is 20° for example, viz. (for mild steel or aluminum):

$$W = \cos 20° \, (2.56T + \text{pi} \, d + 0.02)$$

wherein W equals the width of strip; T equals the thickness of the strip material; $d$ equals the inside diameter of the desired tubing; and the factor 0.02 represents the distance by which the heated edges at the weld point become compressed together. This distance may vary somewhat, depending on the type of metal and its thickness. Thus, for a given width and thickness of the strip material to be used for making tubing of a particular internal diameter, the pitch angle may be varied so as to satisfy the above equation. Alternatively, if tubing of a given wall thickness and inside diameter is desired and with a helical weld with a pitch angle say of 20°, then the width of the strip should be appropriately selected to satisfy the above equation.

In case it is desired to change the diameter of the tubing being formed while still utilizing the greater part of the same equipment, including the high frequency generator and various of the preliminary guiding and feed rollers, then it is desirable to retain the same pitch angle, but to use a strip of an appropriate different width to comply with the equation. In that event, the assembly comprising the mandrel portions and rollers at the region thereof and at the weld point, may preferably be mounted as an assembly on a removable base, so that same may be removed as a unit and replaced by others appropriate for another desired tube diameter. At the same time, the roller portions 13a, 14a, 15a and 16a, as shown in FIGS. 9 and 10, may be replaced by other portions to provide for the desired different radius of curvature of the strip edge portions 12a and 12b.

Although a certain particular embodiment of the invention is herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for forming tubing with a helically-extending weld line, which comprises: advancing a metal strip longitudinally in a direction at an angle to the axis of the tubing being formed, such angle corresponding to the pitch angle of the helical weld line, while causing portions along one edge of the strip to have imparted thereto a transverse curvature substantially corresponding to the cross-sectional curvature of portions of the walls of the tubing being formed; then further advancing the strip in the direction of said axis, while gradually imparting a transverse curvature to the other portions of the strip for bringing same gradually around into a position whereby the opposite edge of the strip comes into a position opposing said one edge and whereby tubing of C-shaped cross-section is formed; further advancing the latter along the direction of said axis while maintaining a helically-extending V-shaped gap between the opposed edges, with the apex of such gap at a weld point; and applying high frequency current to flow along the edges of such gap in advance of said point for heating same to welding temperature at said point and while applying pressure to opposite sides of the tubing at the region of said point for bringing said edges into welded relation.

2. Method for forming tubing with a helically-extending weld line having a relatively small pitch angle, which method comprises: first advancing a metal strip longitudinally in a direction at substantially said angle to the axis of the tubing being formed; then advancing the strip longitudinally in the direction of said axis; meanwhile first imparting transverse curvatures to portions along one edge only of said strip; then imparting transverse curvatures to the portions along the other edge of the strip as the latter portions arrive substantially in positions to form elements extending longitudinally of the surface of the desired tube formation; then imparting further curvatures to the strip, whereby tubing of C-shaped cross-section is formed having an elongated, helically-extending, V-shaped gap between the opposed edges of the strip with the apex of such gap at a weld point; and applying high frequency current to flow along the edges of said gap in advance of said point for heating same to welding temperature at said point, while applying pressure to opposite sides of the formed tubing at the region of said point for bringing said edges into welded relation.

3. Method for forming tubing with a helically-extending weld line having a relatively small pitch angle, which method comprises: advancing a metal strip longitudinally in a direction at substantially said angle to the axis of the tubing being formed, while causing portions along one edge of the strip to have imparted thereto a transverse curvature substantially corresponding to the cross-sectional curvature of portions of the walls of the tubing being formed and thereby imparting longitudinal rigidity to the strip; then further advancing the strip by pushing same forward in the direction of said axis, while twisting other portions of the strip for bringing same gradually around into a position whereby the opposite edge of the strip comes into a position opposing said one edge in a substantially non-offset relation thereto and whereby tubing of C-shaped cross-section is formed; further advancing the latter for a substantial distance along the direction of said axis while maintaining a helically-extending V-shaped gap between the opposed edges, with the apex of such gap at a weld point; and applying high frequency current to flow along the edges of such gap in advance of said point for heating same to welding temperature at said point and while applying pressure to opposite sides of the tubing at the region of said point for bringing said edges into a forged butt-welded relationship.

4. Apparatus for forming tubing with a helically-extending weld line, which comprises: pluralities of rollers for engaging and advancing a metal strip, said rollers being shaped and positioned to impart transverse curvatures to the side portions of the strip and while also twisting same and whereby opposite edges of the strip come into positions opposing each other and thereby forming advancing tubing of C-shaped cross-section and having a helically-extending V-shaped gap between said edges; spreader means interposed in said gap for maintaining same of uniform dimensions and with the apex of the gap at substantially a fixed weld point; means for applying high frequency current to flow along the edges of said gap in advance of said point for heating same to welding temperature at said point; and roller means for applying pressure to opposite sides of the formed tubing at the region of said point for pressing said edges into welded relation.

5. Apparatus for forming tubing with a helically-extending weld line, which comprises: pluralities of rollers for engaging and advancing a metal strip, said rollers being shaped and positioned to impart transverse curvatures to the side portions of the strip and while also twisting same and whereby opposite edges of the strip come into positions opposing each other and thereby forming advancing tubing of C-shaped cross-section and having a helically-extending V-shaped gap between said edges; a mandrel mounted coaxially with and within said formed tubing and free to be rotated by reason of contact with the twisting interior wall surface of said tubing; spreader means interposed in said gap for maintaining same of uniform dimensions and with the apex of the gap at substantially a fixed weld point; means for applying high frequency current to flow along the edges of said gap in advance of said point for heating same to welding temperature at said point; and roller means for applying pressure to opposite sides of the formed tubing at the region of said point for pressing said edges into welded relation.

6. Apparatus for forming tubing with a helically-extending weld line, which comprises: means for guiding an advancing metal strip to move longitudinally in a direction at an angle to the axis of the tubing being formed, such angle corresponding to the pitch angle of said helical weld line; roller means for engaging the advancing strip, said roller means being shaped to impart a transverse curvature to portions along one edge of the strip generally corresponding to the cross-sectional curvature of portions of the walls of the tubing being formed; a plurality of rollers for then engaging other portions of the strip, including those along the opposite edge thereof, said latter rollers being shaped and positioned to impart a transverse curvature to said other portions of the strip and for twisting same gradually around into a position whereby the opposite edge of the strip comes into opposed relation to said one edge, thereby forming tubing of C-shaped cross-section advancing helically about its axis with said edges forming a helically-extending V-shaped gap therebetween and with the apex of the gap at a weld point; means for applying high frequency current to flow along the edges of the gap in advance of said point for heating same to welding temperature at said point; and rollers engaging opposite sides of the tubing at the region of said point for pressing said edges into welded relation.

7. Apparatus for forming tubing with a helically-extending weld line, which comprises: means for guiding an advancing metal strip to move longitudinally in a direction at an angle to the axis of the tubing being formed, such angle corresponding to the pitch angle of said helical weld line; roller means for engaging the advancing strip, said roller means being shaped to impart a transverse substantially arcuate curvature to portions along one edge of the strip; a plurality of rollers for then engaging other portions of the strip, including those along the opposite edge thereof, said latter rollers being shaped and positioned to impart a transverse curvature to said other portions of the strip for twisting same gradually around into a position whereby the opposite edge of the strip comes into opposed relation to said one edge, thereby forming tubing of C-shaped cross-section advancing helically about its axis with said edges forming a helically-extending V-shaped gap therebetween and with the apex of the gap at a weld point; a mandrel mounted coaxially with and within said formed tubing and free to be rotated by reason of contact with the twisting interior wall surfaces of said tubing; means for applying high frequency current to flow along the edges of the gap in advance of said point for heating same to welding temperature at said point; and rollers engaging opposite sides of the tubing at the region of said point for pressing said edges into welded relation.

8. Apparatus in accordance with the foregoing claim 4 and in which the upper portions of said rollers at the region of the weld point are spaced apart and a pair of additional rollers mounted therebetween in engagement respectively with the tube metal at opposite sides of the weld point.

References Cited by the Examiner
UNITED STATES PATENTS

| | | | |
|---|---|---|---|
| 2,155,859 | 4/39 | Harford | 113—35 |
| 2,873,353 | 2/59 | Rudd | 219—62 |

RICHARD M. WOOD, *Primary Examiner.*